US012550061B2

United States Patent
Agarwal et al.

(10) Patent No.: US 12,550,061 B2
(45) Date of Patent: Feb. 10, 2026

(54) ENHANCED POWER SAVING TECHNIQUE BASED ON WAKE-UP SIGNAL FUNCTIONALITY

(71) Applicant: QUALCOMM Incorporated, San Diego, CA (US)

(72) Inventors: Rishav Agarwal, Howrah (IN); Nishika Singla, Ambala (IN); Vishnu Namboodiri Karakkad Kesavan Namboodiri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 695 days.

(21) Appl. No.: 17/811,283

(22) Filed: Jul. 7, 2022

(65) Prior Publication Data

US 2024/0015654 A1 Jan. 11, 2024

(51) Int. Cl.
*H04W 52/02* (2009.01)

(52) U.S. Cl.
CPC ... *H04W 52/0235* (2013.01); *H04W 52/0251* (2013.01)

(58) Field of Classification Search
CPC ............ H04W 52/0235; H04W 52/0251
See application file for complete search history.

(56) References Cited

U.S. PATENT DOCUMENTS

| | | | | |
|---|---|---|---|---|
| 10,750,564 | B2 * | 8/2020 | Zhou | H04W 76/19 |
| 10,785,804 | B2 * | 9/2020 | Park | H04L 5/0053 |
| 11,284,477 | B2 * | 3/2022 | Islam | H04W 76/11 |
| 11,405,866 | B2 * | 8/2022 | Kim | H04W 72/23 |
| 11,424,878 | B2 * | 8/2022 | Da Silva | H04B 7/0626 |
| 11,503,547 | B2 * | 11/2022 | Seo | H04W 72/23 |
| 11,792,874 | B2 * | 10/2023 | Tsai | H04W 76/27 |
| | | | | 370/329 |
| 11,950,280 | B2 * | 4/2024 | Iyer | H04W 72/23 |
| 2021/0250156 | A1 * | 8/2021 | Kim | H04W 72/23 |
| 2022/0279447 | A1 * | 9/2022 | Zhou | H04W 76/28 |
| 2022/0295403 | A1 * | 9/2022 | Shrestha | H04W 4/70 |

FOREIGN PATENT DOCUMENTS

CN 114365551 A * 4/2022 ............ H04W 72/00

OTHER PUBLICATIONS

Machine Translation of CN-114365551.*

* cited by examiner

*Primary Examiner* — Kevin T Bates
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for a power saving technique associated with a WUS. A UE may obtain an indication that an expiration of a BWP inactivity timer occurs during a first time duration without a data communication of the UE and calculate at least one of a first amount of time from the indication to a WUS monitoring occasion or a second amount of time from the indication to a second time duration with the data communication of the UE. The UE may switch from a first BWP to a second BWP based on the calculation of at least one of the first amount of time from the indication to the WUS monitoring occasion or the second amount of time from the indication to the second time duration with the data communication of the UE.

27 Claims, 11 Drawing Sheets

ENHANCED POWER SAVING TECHNIQUE BASED ON WAKE-UP SIGNAL FUNCTIONALITY

TECHNICAL FIELD

The present disclosure relates generally to communication systems, and more particularly, to a power saving technique associated with a wake-up signal (WUS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may obtain an indication that an expiration of a bandwidth part (BWP) inactivity timer occurs during a first time duration without a data communication of a user equipment (UE); calculate at least one of a first amount of time from the indication to a wake-up signal (WUS) monitoring occasion or a second amount of time from the indication to a second time duration with the data communication of the UE; and switch from a first BWP to a second BWP based on the calculation of at least one of the first amount of time from the indication to the WUS monitoring occasion or the second amount of time from the indication to the second time duration with the data communication of the UE.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
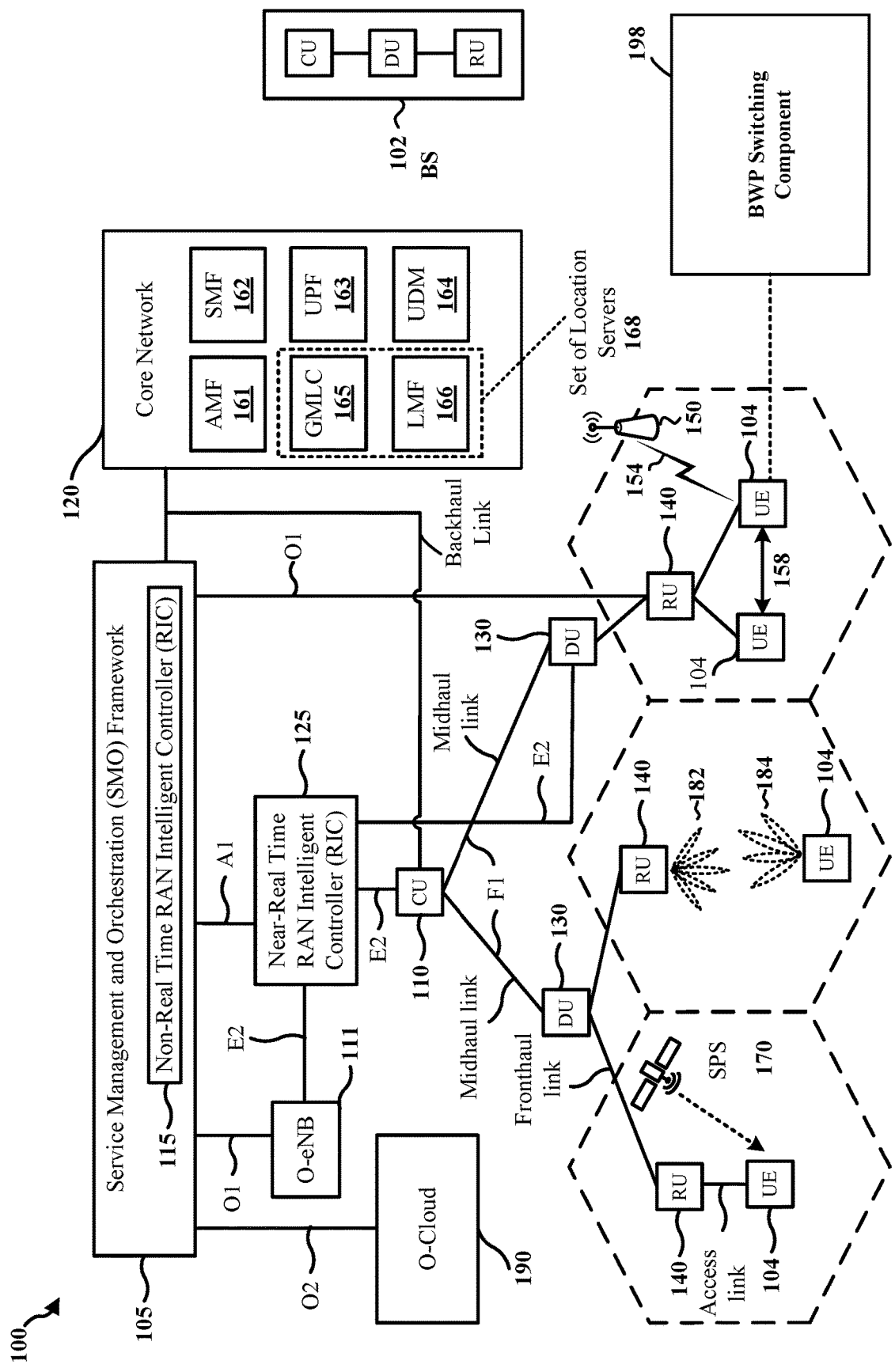
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective user equipments (UEs) 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a bandwidth part (BWP) switching component 198 configured to obtain an indication that an expiration of a BWP inactivity timer occurs during a first time duration without a data communication of the UE; calculate at least one of a first amount of time from the indication to a wake-up signal (WUS) monitoring occasion or a second amount of time from the indication to a second time duration with the data communication of the UE; and switch from a first BWP to a second BWP based on the calculation of at least one of the first amount of time from the indication to the WUS monitoring occasion or the second amount of time from the indication to the second time duration with the data communication of the UE. Although the following description may be focused on 5G NR, the concepts described herein may be applicable to other similar areas, such as LTE, LTE-A, CDMA, GSM, and other wireless technologies.

Figure 2:
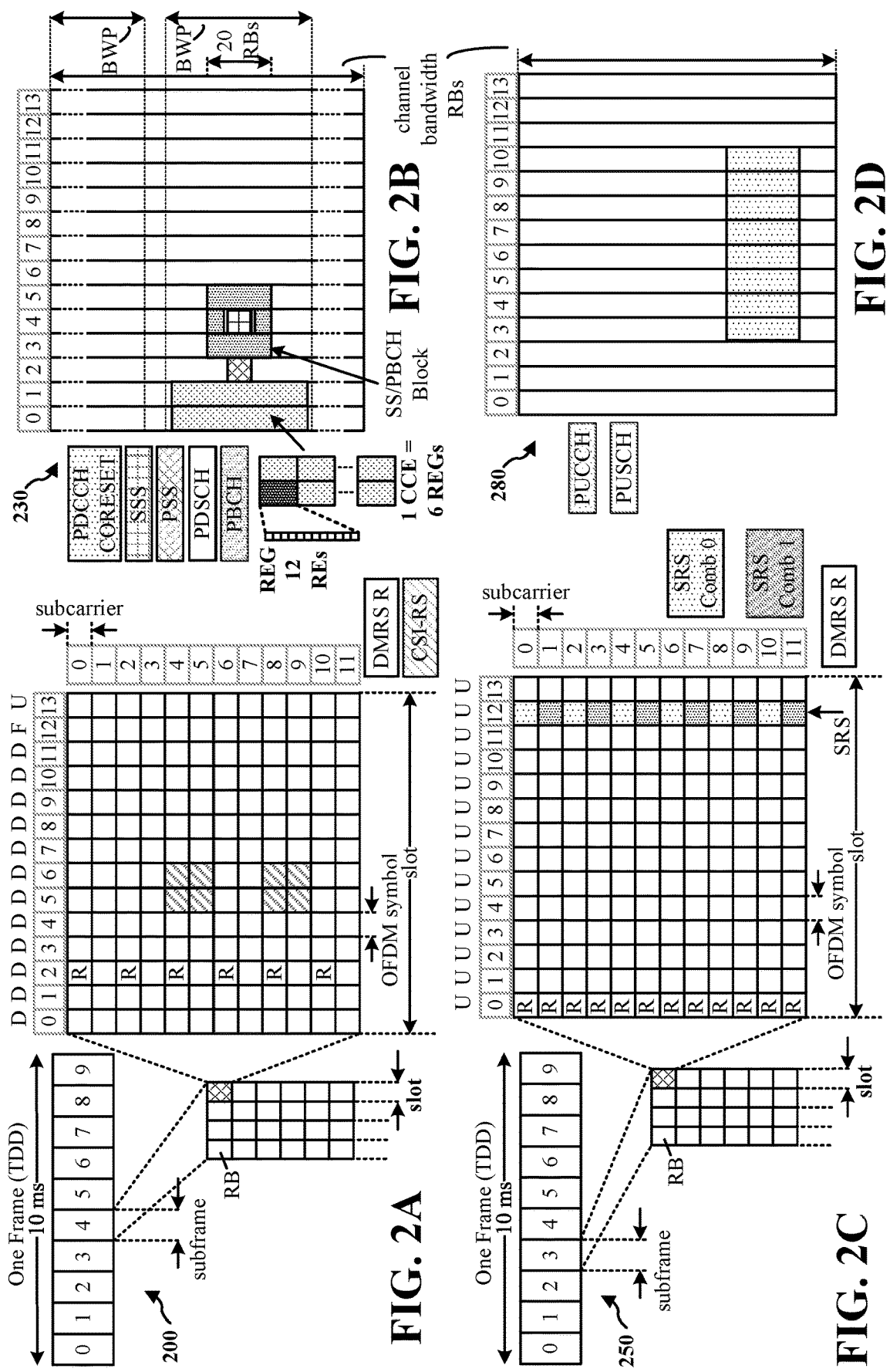
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15[kHz]$ | Cyclic prefix |
|---|---|---|
| 0 | 15 | Normal |
| 1 | 30 | Normal |
| 2 | 60 | Normal, Extended |

| μ | SCS<br>Δf = $2^μ · 15$[kHz] | Cyclic prefix |
|---|---|---|
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^μ$ slots/subframe. The subcarrier spacing may be equal to $2^μ*15$ kHz, where μ is the numerology 0 to 4. As such, the numerology 1.1=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
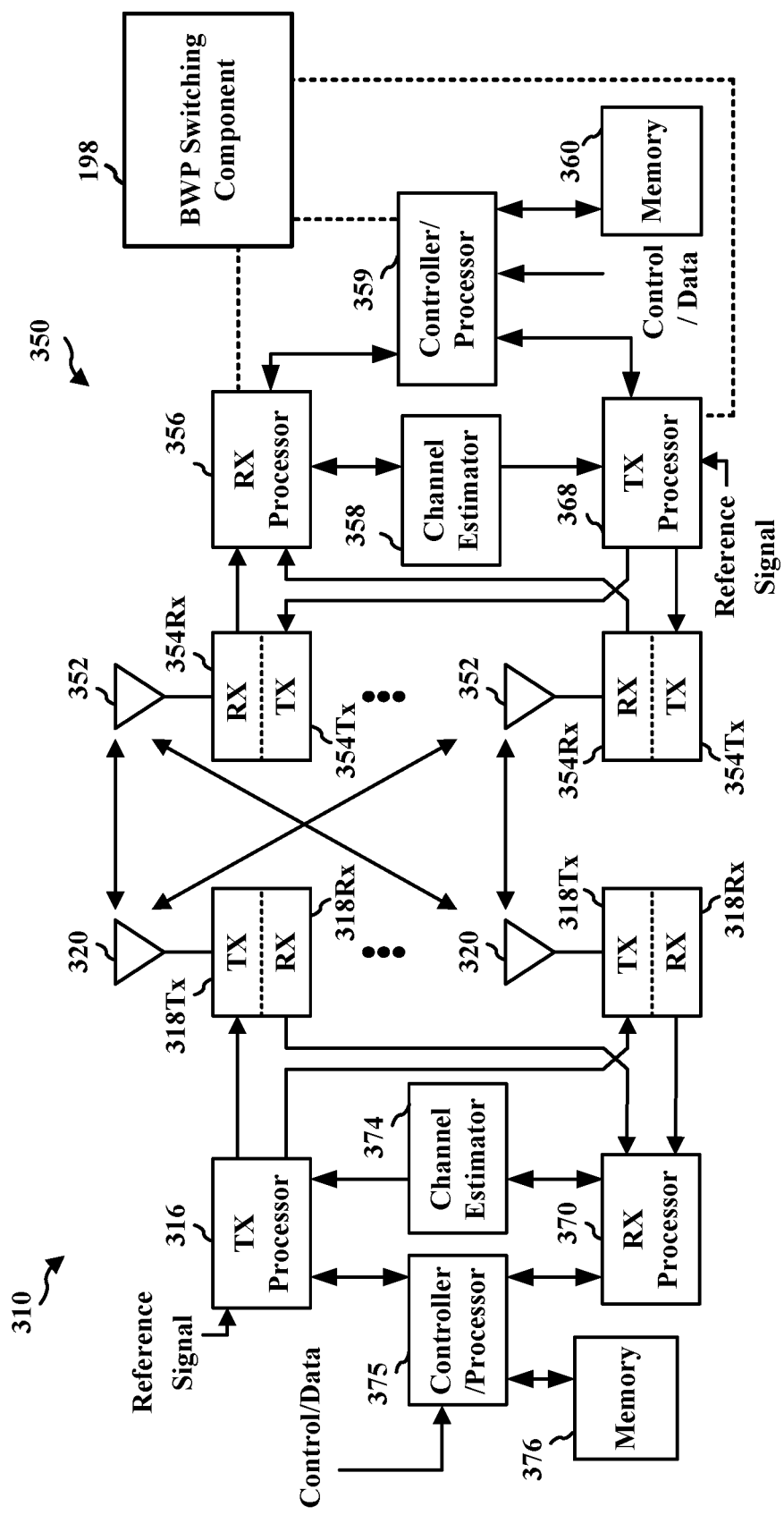
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/ processor 375 is also responsible for error detection using an ACK and/or NACK protocol to support HARQ operations.

At least one of the TX processor 368, the RX processor 356, and the controller/processor 359 may be configured to perform aspects in connection with the BWP switching component 198 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
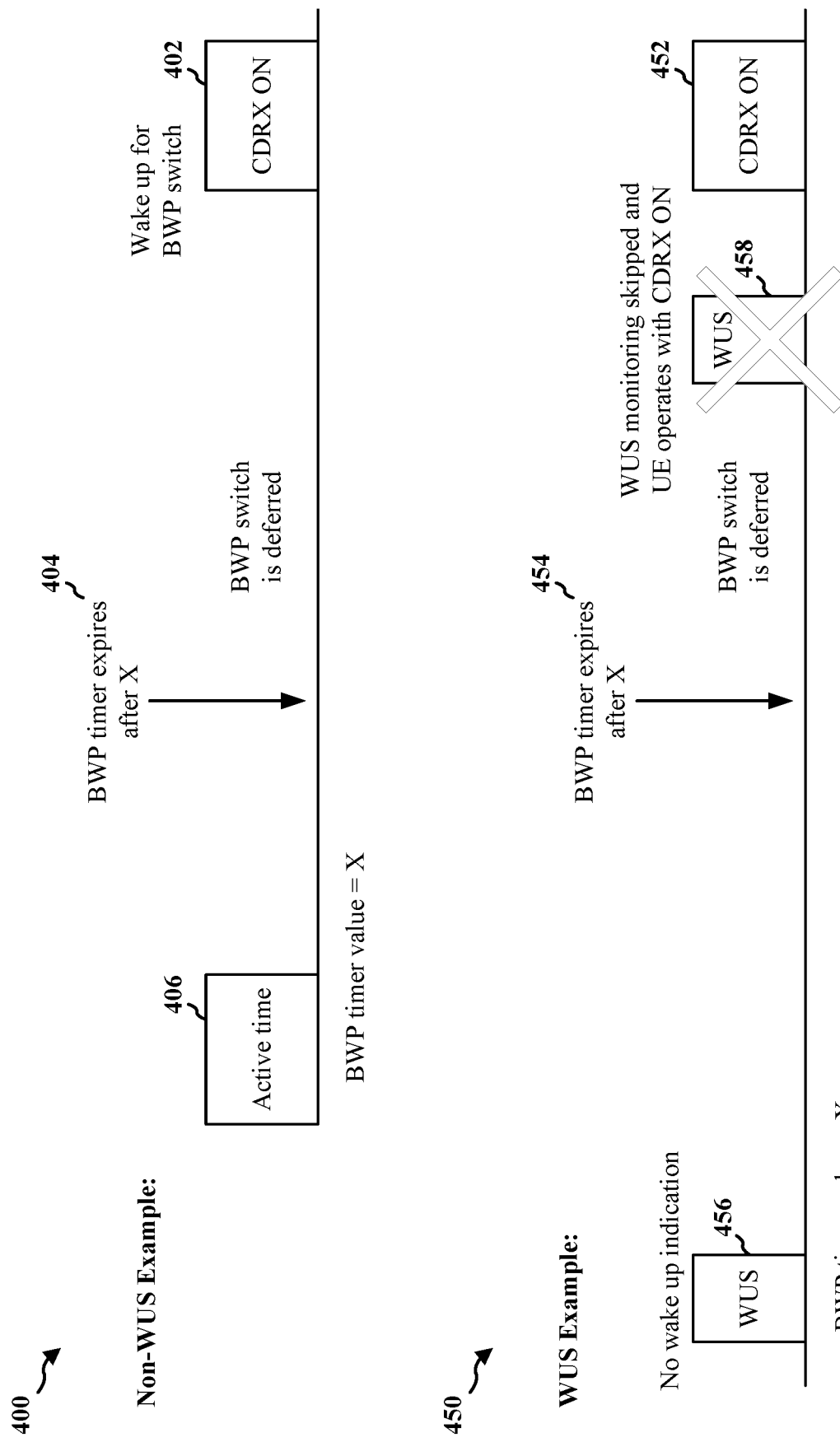
FIG. 4 illustrates diagrams associated with an expiration of a bandwidth part (BWP) inactivity timer.

FIG. 4 illustrates diagram 400 and diagram 450 associated with an expiration of a BWP inactivity timer. A WUS may be transmitted by the network to trigger a CDRX active state of a UE, which may be referred to as a CDRX ON state 452, when downlink data is expected to be received by the UE. If the network does not have downlink data to transmit to the UE, the UE may not have to wake up and may be maintained in a CDRX inactive state, which may be referred to as a CDRX OFF state. CDRX ON refers to a first time duration where the UE may transmit or receive data from the network. CDRX OFF refers to a second time duration where the UE does not transmit or receive data from the network. Operations of the UE may be based on a periodic CDRX ON/OFF cycle for conserving power at the UE. The UE may consume more power during the CDRX ON state 402/452 than the CDRX OFF state and may therefore be cycled ON/OFF to conserve power during times that the UE is not expecting to receive downlink data from the network. The UE may transition between CDRX OFF and CDRX ON 402/452 based on a predefined schedule. However, a WUS transmitted by the network during a WUS occasion 456 may be used for triggering the CDRX ON state 452 at the UE for the network to transmit downlink data to the UE.

The WUS may be associated with a certain DCI format (e.g., DCI 2_6) and may be received at a certain preconfigured occasion (e.g., WUS occasion 456) that precedes the CDRX ON state 452. WUS refers to a paging indication transmitted to the LE that indicates whether the LE should activate from an idle state and prepare for a downlink data reception. The WIJS may enable the resources and/or receiver of the UE to remain in an idle state until data is received for reducing power consumption at the LE. That is, the WUS may trigger the UE to "wake up" (e.g., trigger the UE to "wake up" from a sleep mode or an inactive mode), determine whether downlink data is expected to be received from the network (e.g., based on the WUS), and based on whether the WUS includes a "true" or a "false" indication for the downlink data, the UE may operate in one of the CDRX ON/OFF states. The UE may monitor for PDCCH associated with a WUS DCI at the WUS occasion 456 preceding the CDRX ON state 452.

A BWP inactivity timer having a BWP timer value=X may be maintained at the UE, such that the BWP timer may expire, at 404/454, after X duration of inactivity associated with downlink data from the network. The BWP inactivity timer may be configured by the network. In examples, the BWP inactivity timer may expire, at 454, before a periodic WUS occasion 458 for which the WUS DCI is configured. If the BWP inactivity timer expires, at 454, while the UE is in the CDRX OFF state, the UE may wake up at the time of expiration (e.g., at 454), which may be prior to the scheduled CDRX ON state 452, and skip PDCCH monitoring for the WUS DCI at the periodic WUS occasion 458.

A DCI with a cyclic redundancy check (CRC) scrambled by a power saving-radio network temporary identifier (PS-RNTI)) (DCP) configuration may be received by the UE including information indicative of WUS occasions (e.g., 456/458) and durations. The DCP configuration may be indicated based on dcp-Config, where a power saving offset may be further indicated based on ps-Offset. The offset may be associated with a time duration at which the UE may wake up and monitor for the WUS. For example, based on ps-Offset 40, the UE may wake up at (40 slots*0.125 ms/slot)=5 ms before a CDRX ON time and begin monitoring for a WUS DCI 2_6 (e.g., based on sizeDCI-2-6 39). The duration of the slots may be based on the SCS. For example, 0.125 ms/slot may correspond to an SCS of 120 kHz, ms/slot may correspond to an SCS of 30 kHz, etc. The duration of the slots may be adjusted based on different procedures of the UE and the ps-Offset that the duration is multiplied by (e.g., 40 slots) may be configured by the network. The product of the number of slots and the slot duration (e.g., 5 ms) may correspond to a wake up time for the UE.

The DCI may be decoded by the UE during the WUS occasion 456 and, based on the DCI payload, the UE may determine to either wake up or remain in the "sleep" state. In the above example, the periodic offset may be 5 ms, at which time the UE may initiate the WUS occasion 456 where the UE may receive a WUS payload. If a wakeup indication=0, the network may not be intending to transmit downlink data to the UE. If the wakeup indication=1, the network may be intending to transmit downlink data to the UE. Thus, the UE may avoid transitioning to the CDRX ON state 452 from the CDRX OFF state, if the DCI payload includes a WUS indication that no downlink data is expected to be transmitted from the network. That is, the UE may remain in the CDRX OFF state (e.g., the "sleep" state).

After the BWP inactivity timer expires after X duration, at 454, the network may transmit WUS DCI on a different BWP than the BWP that the network was using before the BWP inactivity timer expired, at 454. Further, the UE may not switch from a current BWP to the different BWP until the UE transitions to the CDRX ON state 452. If the BWP inactivity timer expires, at 454, during the CDRX OFF state, having the UE wake up to decode the WUS DCI during the periodic WUS occasion 458 may be purposeless, as the WUS DCI may be associated with a different BWP than the BWP that the UE is currently monitoring. Thus, a power cycle of the UE may be decreased based on the BWP inactivity timer expiring, at 454, during the CDRX OFF state before the periodic WUS occasion 458. The network may expect that the UE is utilizing the different BWP after the BWP inactivity timer expires, at 454, and may transmit the WUS during the periodic WUS occasion 458 on the different BWP, even though the UE may not have actually switched to the different BWP yet.

When the BWP inactivity timer expires, at 454, during the CDRX OFF state, WUS functionality may not be retained, as the network may not transmit the WUS DCI on the previous BWP that the UE may still be utilizing. The UE may perform the BWP switch immediately before transitioning to the CDRX ON state 452. In examples where the UE is in the CDRX ON state prior to the periodic WUS occasion 458, WUS monitoring for the periodic WUS occasion 458 may be skipped and the UE may continue to operate with CDRX ON after the BWP switch. WUS techniques may be performed in association with procedures such as transmitting periodic channel state information (CSI), layer 1 (L1) reference signal received power (RSRP) reporting, selective CDRX ON activation, SCell dormancy information, etc.

If the BWP inactivity timer expires, at 454, while the UE is in the CDRX OFF state, the UE may not be able to monitor for the WUS DCI, which may be transmitted by the network on the different BWP that the UE may not switch to until the UE transitions to the CDRX ON state 452. Thus, the UE may have to perform a forced transition to the CDRX ON state 452 upon the BWP inactivity timer expiring, at 454, as the UE may not otherwise be able to determine whether the DCI payload is true or false. That is, the UE may not be able to determine whether the network is intending to transmit downlink data to the UE. The UE may have to decodes the WUS DCI/WUS payload in order to determine whether downlink data is expected from the network. However, since the UE may not be able to decode the WUS information based on the BWP inactivity timer expiring, at 454, before the periodic WUS occasion 458 arrives, the UE may have to switch to the CDRX ON state 452 to decrease the risk of missing downlink data from the network.

If the UE skips the WUS occasion and transitions to the CDRX ON state 452 for the BWP switching, the UE may maintain the CDRX ON state 452 until a CDRX ON timer expires. However, an earlier transition to the CDRX ON state 452 may not be needed if the WUS indication is false (e.g., WUS indication=0). However, if the UE is unable to decode the DCI payload based on the periodic WUS occasion 458 being skipped, the UE may not "sleep" as the UE may not be able to determine whether the WUS indication is true or false (e.g., whether the network is intending to transmit downlink data). Thus, even if no downlink data is to be transmitted by the network, the UE may remain "awake" in the CDRX ON state 452 based on the UE being unable to decode the DCI payload. If the network is not intending to transmit downlink data to the UE, power wastage may occur at the UE based on the UE consuming an increased amount of power in the CDRX ON state 452, as opposed to the CDRX OFF state. In an example associated with a 50 percent probability that the WUS indication=false, the UE may unnecessarily remain awake for half the instances where the WUS occasion is skipped.

In a non-WUS example, the UE may initiate a BWP inactivity timer after an active time 406 of the UE, where the BWP inactivity timer may be based on a BWP timer value=X. After X duration of inactivity, the BWP timer may expire, at 404. However, a BWP switch from a first BWP to a second BWP may be deferred until the UE wakes up for the CDRX ON state 402 and performs the BWP switch. In a WUS example, the UE may monitor for WUS DCI during a WUS occasion 456, but may not receive a wake up indication from the network during the WUS occasion 456. Hence, the BWP inactivity timer may be initiated based on a BWP timer value=X. After X duration of inactivity, the BWP timer may expire, at 454, such that the BWP switch from the first BWP to the second BWP may be deferred until the UE wakes up. In examples, a periodic WUS occasion 458 for WUS monitoring may be skipped based on the BWP timer expiring, at 454, and the UE may wake up to operate with CDRX ON in case the network has downlink data to transmit. That is, the UE may wake up prior to the scheduled CDRX ON state 452 to reduce the chance of missing downlink data transmitted to the UE between the BWP timer expiration, at 454, and the scheduled CDRX ON state 452.

Figure 5:
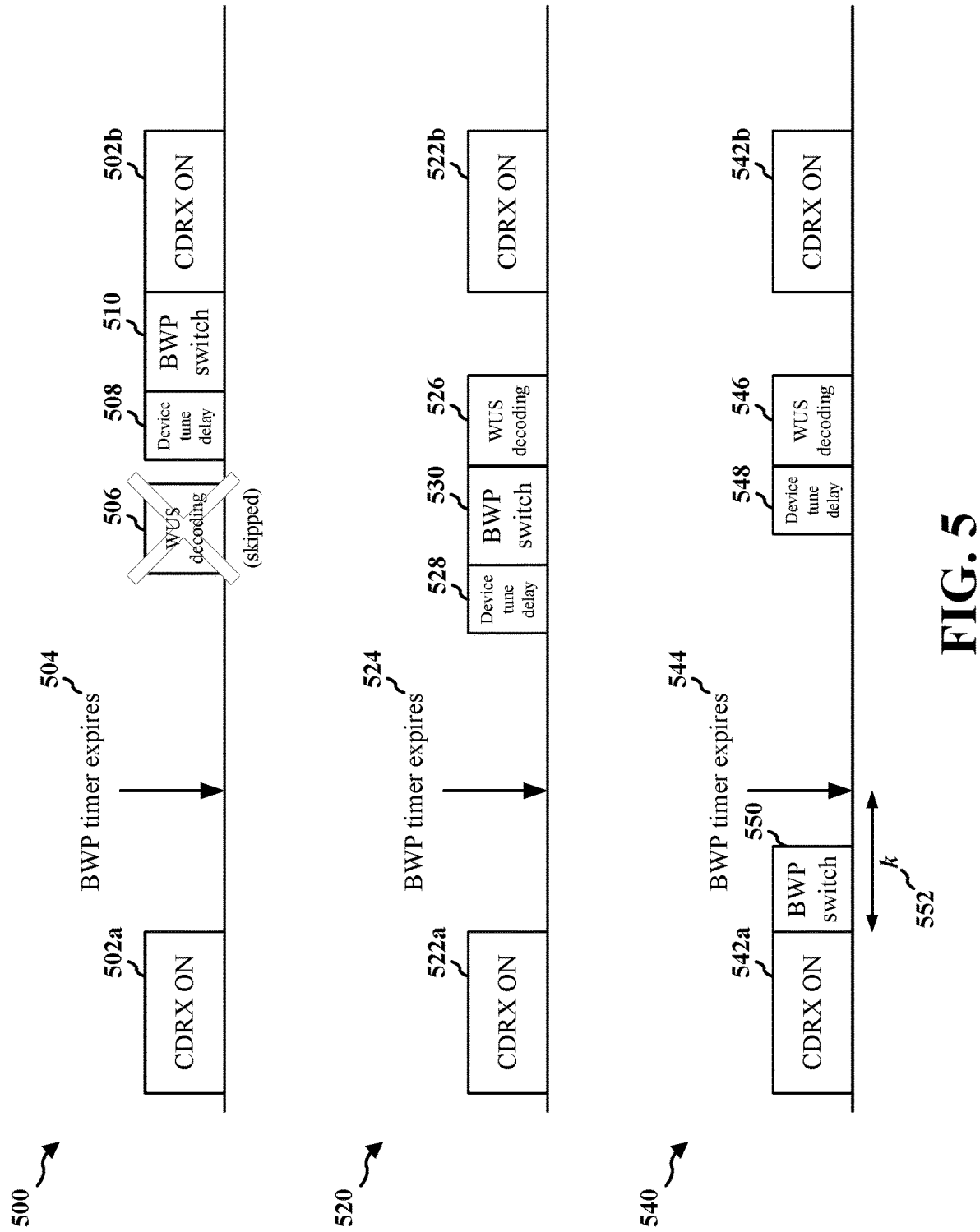
FIG. 5 illustrates diagrams associated with a BWP switch and an expiration of a BWP inactivity timer.

FIG. 5 illustrates diagrams 500-540 associated with a BWP switch 510/530/550 and an expiration of a BWP inactivity timer. In the diagram 500, the UE may skip WUS decoding 506 of the WUS DCI based on the WUS DCI being transmitted by the network on a different BWP from a current BWP that the UE is monitoring. The UE may perform a BWP switch 510 from the current BWP to the different BWP after the UE skips the WUS decoding 506 of the WUS DCI based on transitioning to the CDRX ON state 502b. Based on the diagram 500, the UE may transition to the CDRX ON state 502b even when the network is not intending to transmit downlink data to the UE. Switching to the CDRX ON state 502b when the network does not have downlink data to transmit to the UE may waste power at the UE.

The UE may cycle through a first CDRX ON state 502a. After the first CDRX ON state 502a concludes, the UE may transition to a CDRX OFF state and initiate a BWP inactivity timer. The BWP timer may expire, at 504, after a certain duration of inactivity associated with the BWP inactivity timer. In the diagram 500, once the BWP timer expires, at 504, the UE may transition from CDRX OFF to CDRX ON prior to a next scheduled CDRX ON state 502b, as the network may switch BWPs based on the BWP inactivity timer expiring, such that the UE may have to be in the CDRX ON state 502b to receive a downlink data transmission from the network on the switched BWP. Since the UE may transition to CDRX ON upon the BWP timer expiring, at 504, the UE may skip WUS decoding 506, which may be indicative of whether the UE should wake up. If the UE does not transition to CDRX ON upon the BWP timer expiring, the UE may perform a BWP switch 510 after a device tune delay 508 and before the next scheduled CDRX ON state 502b.

The diagram 520 illustrates an example where the UE may avoid skipping WUS decoding 526 without consuming unnecessary power associated with the CDRX ON state 522b. The UE may cycle through a first CDRX ON state 522a. After the first CDRX ON state 522a concludes, the UE may transition to a CDRX OFF state and initiate a BWP inactivity timer. The BWP timer may expire, at 524, after a certain duration of inactivity associated with the BWP inactivity timer.

If the BWP inactivity timer expires, at 524, before the UE transitions to the next scheduled CDRX ON state 522b and the UE is configured with the DCP configuration, the UE may determine an amount of time remaining between the expiration of the BWP inactivity timer and the WUS occasion for WUS decoding 526. Based on the amount of time remaining, the UE may trigger the BWP switch 530 after a device tune delay 528 and before WUS decoding 526 (e.g., the UE may prepone the BWP switch 530), rather than waiting to switch the BWP based on the next scheduled CDRX ON state 522b. The BWP switch 530 may be trigger before WUS decoding 526, so that the UE may decode the WUS DCI based on the different BWP that the network is using to transmit the WUS DCI. After the UE decodes the WUS DCI payload, the UE may determine whether to transition to CDRX ON or remain in the CDRX OFF state based on whether the network is intending to transmit downlink data to the UE. In the example associated with the 50 percent probability that the WUS indication=false, the UE may conserve power (e.g., continue to "sleep") by remaining in the CDRX OFF state when the network does not have downlink data to transmit to the UE.

In the diagram 540, the UE may attempt to time the BWP switch 550 based on a previous CDRX cycle, rather than switching the BWP based on a time associated with WUS decoding 526, as illustrated in the diagram 520, or based on a next scheduled CDRX ON state 502b, as illustrated in the diagram 500. The UE may time the BWP switch 550 base on a k value 552. The k value 552 may correspond to a parameter indicative of a remaining time until the expiration of the BWP inactivity timer. For example, the k value 552 may correspond to a timer duration between a conclusion of a first CDRX ON state 542a and the BWP timer expiring, at 544. In an example, the k value 552 that follows the first CDRX ON state 542a may correspond to 4-5 slots, which may be a shorter amount of time than waiting for the BWP inactivity timer to expire, at 544, and performing the BWP switch 530 prior to WUS decoding 526, as illustrated in the diagram 520. Instead, the BWP switch 550 may be performed based on the conclusion of the first CDRX ON state 542a. If the k value 552 is expected to be small (e.g., equal to a time duration for performing the BWP switch 550, or perhaps plus 1-2 additional slots), the UE may determine whether the BWP inactivity timer is currently running. If so, the UE may calculate a remaining time from the completion of the BWP switch 550 to the BWP timer expiration, at 544, where the reaming time may be less than the k value 552. Based on the BWP switch 550, the UE may perform WUS decoding 546 after a device tune delay 548 and before a next scheduled CDRX ON state 542b.

Figure 6:
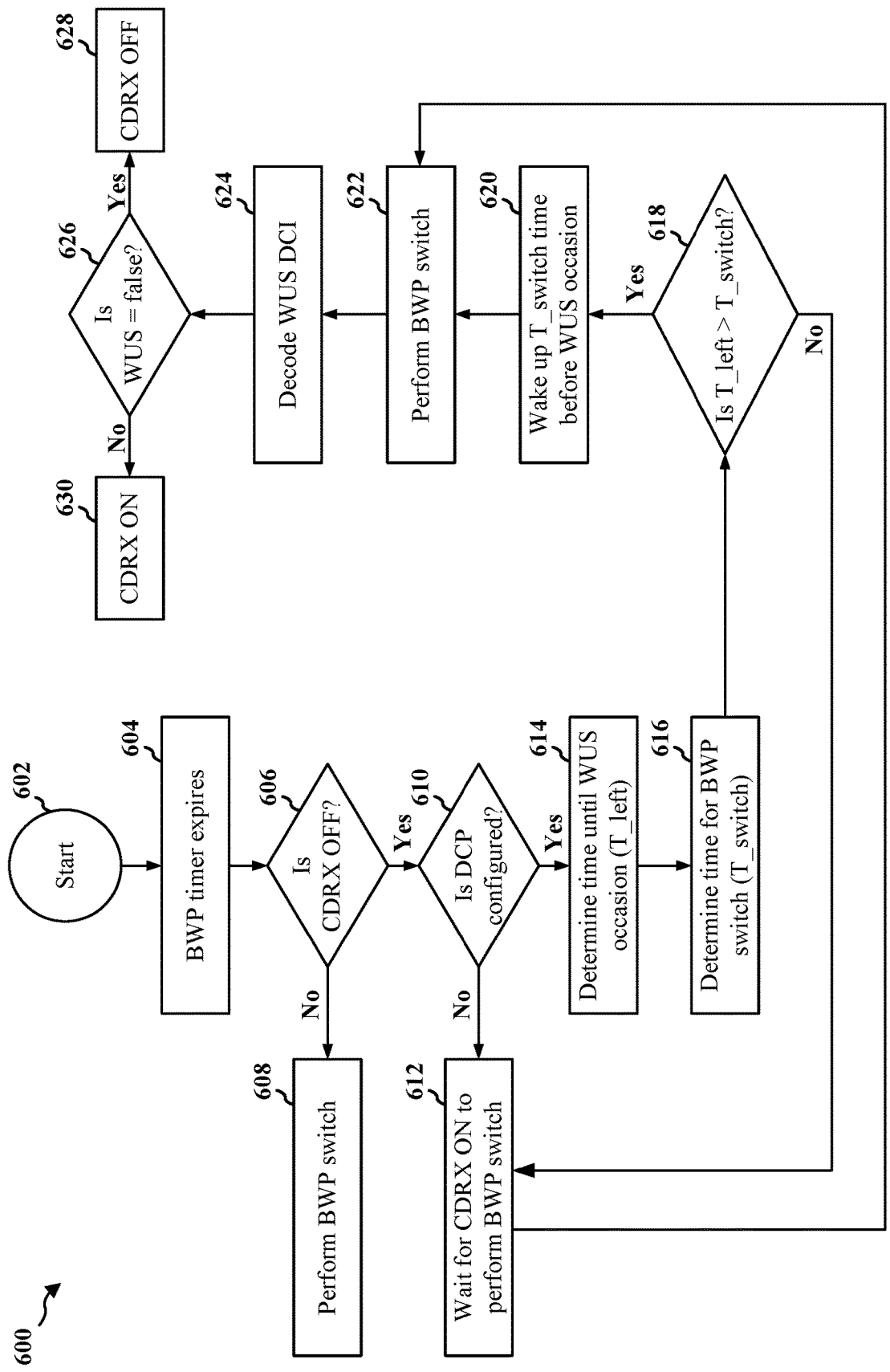
FIG. 6 illustrates a flow diagram for switching the BWP at a time that precedes a wake-up signal (WUS) decoding occasion.

FIG. 6 illustrates a flow diagram 600 for switching the BWP at a time that precedes a WUS decoding occasion. For example, the flow diagram 600 may correspond to the diagram 520, where the BWP switch is preponed to a time before the WUS decoding occasion. The flow diagram 600 starts, at 602, and the UE may detect, at 604, that the BWP inactivity timer has expired.

At 606, the UE may determine whether BWP inactivity timer expiration occurs during the CDRX OFF state of the UE. If, at 606, the UE determines that the BWP inactivity timer does not expire during the CDRX OFF state (e.g., the CDRX is "ON"), the UE may perform, at 608, the BWP switch at that time. If, at 606, the UE determines that the BWP inactivity timer does expire during the CDRX OFF state, the UE may determine, at 610, whether the UE is DCP configured (e.g., whether the UE has received a DCP configuration from the network).

If, at 610, the UE determines that the UE is DCP configured based on receiving the DCP configuration from the network, the UE may determine, at 614, an amount of time reaming until the WUS occasion, where the amount of time remaining may correspond to T_left. The UE may also determine, at 616, a time duration for performing the BWP switch, where the time duration may correspond to T_switch. At 618, the UE may determine whether T_left>T_switch. That is, the UE may determine, at 618, whether the BWP switch may be performed within the time interval associated with the amount of time remaining until the WUS occasion. In examples where the UE determines, at 610, that the UE is not DCP configured, the UE may wait, at 612, for the CDRX ON state to perform the BWP switch, at 622.

If, at 618, the UE determines that T_left is not greater than T_switch, the UE may likewise wait, at 612, for the CDRX ON state to perform the BWP switch, at 622. If, at 618, the UE determines that T_left is greater than T_switch, the UE may wake up, at 620, T_switch time before the WUS occasion to perform, at 622, the BWP switch. The BWP switch performed, at 622, may occur over a certain number of slots. For example, the UE may utilize 2-4 slots to perform BWP switching. If the BWP switching may allow the UE to perform operations on the different BWP that the network has switched to for transmitting the WUS DCI. The UE may monitor for PDCCH on the switched BWP and receive/decode the WUS DCI, at 624. The WUS DCI may correspond to a DCI 2_6 format, which refers to a DCI format used to indicate information for one or more UEs in a group.

At 626, the UE may determine whether the WUS=false. That is, the UE may determine whether the network does not have downlink data to transmit to the UE. If, at 626, the WUS=false and the network does not have downlink data to transmit to the UE, the UE may be maintained, at 628, in the CDRX OFF state to conserve power at the UE. If, at 626, the WUS false (e.g., the WUS=true) and the network does have downlink data to transmit to the UE, the UE may transition, at 630, to the CDRX ON state.

Figure 7:
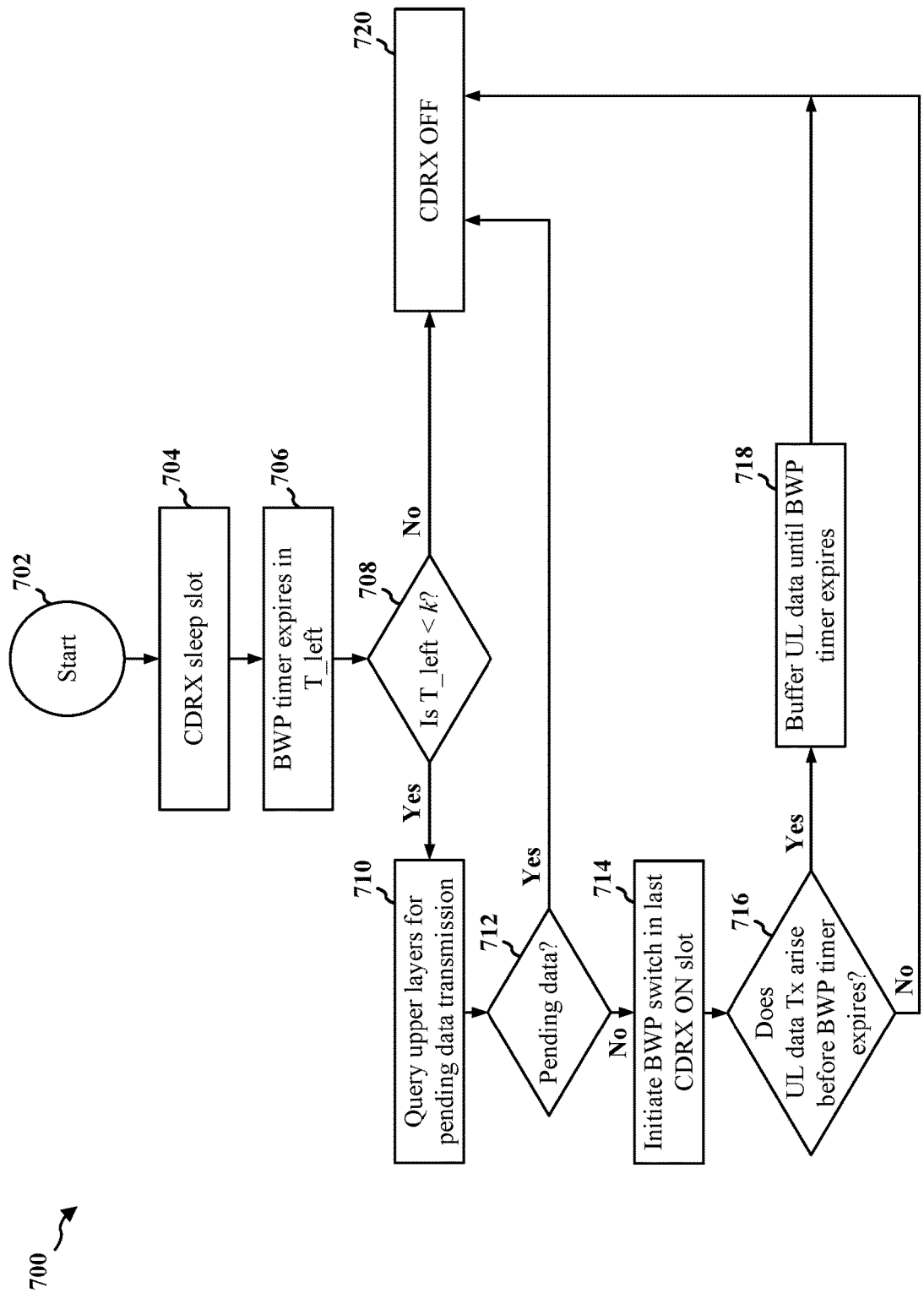
FIG. 7 illustrates a flow diagram for switching the BWP based on a previous connected mode discontinuous reception (CDRX) cycle.

FIG. 7 illustrates a flow diagram 700 for switching the BWP based on a previous CDRX cycle. For example, the flow diagram 700 may correspond to the diagram 540, where the BWP is switched prior to the expiration of the BWP inactivity timer. The flow diagram 700 starts, at 702, and the UE may be at a CDRX sleep slot, at 704. The UE may determine that the BWP inactivity timer is running during the CDRX sleep slot (e.g., the CDRX OFF state) and may calculate, at 706, a net time until expiration of the BWP inactivity timer. Hence, the UE may determine, at 706, that the BWP timer expires in T_left, where T_left corresponds to the net time remaining until BWP timer expiration.

At 708, the UE may determine whether T_left<k, where k is a value that may correspond to an implementation dependent threshold associated with the net time to BWP timer expiration. The k value may be configured by the network. If, at 708, the UE determines that T_left is not less than k (e.g., the remaining time until expiration of the BWP inactivity timer is greater than k slots or greater than a certain number of ms), the UE may be maintained, at 720, in the CDRX OFF state. If, at 708, the UE determines that T_left<k (e.g., the remaining time until expiration of the BWP inactivity timer is less than k slots or less than the certain number of ms), the UE may query, at 710, upper layers of the UE for a pending data transmission.

Based on the query, at 710, of the upper layers for the pending data transmission, the UE may determine, at 712, whether the UE has pending data to transmit to the network. If so, the UE may be maintained, at 720, in the CDRX OFF state, as transitioning to the CDRX ON state may cause the UE to switch BWPs before the network switches the BWPs, such that the uplink data transmission may be transmitted on a different BWP than the network may be using to monitor for/receive the uplink data transmission, which may cause the uplink data transmission to fail. If, at 712, the UE determines that there is no pending data to transmit to the network before the BWP inactivity timer expires, the UE may initiate, at 714, the BWP switch in the last CDRX ON slot that precedes one or more sleep slots.

The UE may monitor for uplink data transmissions that arise after the BWP switch is initiated, at 714, but before BWP timer expiration. If the UE determines, at 716, that an uplink data transmission arises after the BWP switch and before the BWP timer expires, the UE may buffer, at 718, the uplink data until the BWP timer expires, at which time the network may also switch to the BWP that the UE switched to, at 714, in the last slot of the CDRX ON state. Buffering the uplink data, at 718, may not have a significant impact on UE performance, as the k value may be small (e.g., 4-5 slots). If, at 716, the UE does not detect an uplink data transmission that arises after the BWP switch and before the BWP timer expires, the UE may be maintained, at 720, in the CDRX OFF state.

The UE may conserve power by refraining from transitioning to the CDRX ON state if the UE is not expecting to receive downlink data from the network. Accordingly, the UE may retain WUS functionality, rather than skipping the WUS decoding occasion and switching to the CDRX ON state. The WUS may trigger UE reporting, SCell dormancy information, etc. A power saving calculation may be based on a T_switch, which may correspond to a time associated with switching BWPs in milliseconds or slots (e.g., 2-5 slots); a T_CDRX ON, which may correspond to a CDRX ON duration in milliseconds or slots (e.g., based on a configuration); a T_RF delay, which may correspond to an RF delay time for a tuning operation/wake up procedure in milliseconds or slots for RF switching; and/or a T_WUS, which may correspond to a WUS decoding duration in milliseconds or slots. Referring again to FIG. 5, a total active/awake time for the diagram 500, where the WUS is skipped and the BWP is switched based on a periodic cycle, may be equal to T_RF delay+T_switch+T_CDRX ON.

For the diagram 520, the total active/awake time of the UE may be equal to T_switch+T_RF delay+T_WUS+ (P*T_CDRX ON), where P may correspond to a probability that the WUS indication=false. For example, there may be a 50 percent probability that the WUS indication=false (e.g., that the network is not intending to transmit downlink data to the UE) and a 50 percent probability that the WUS indication=true (e.g., that the network is intending to transmit downlink data to the UE). $P*T\_CDRX\ ON$ may be indicative of the power savings at the UE, as T_RF delay and T_WUS may be small compared to T_CDRX ON. For example, T_CDRX ON may be 10-30 ms, whereas T_WUS may be 1-2 ms on average. For the diagram 540, the total active/awake time of the UE may also be equal to T_switch+ T_RF delay+T_WUS+(P*T_CDRX ON). A delta (e.g., difference) in the values of the active/awake times for the diagram 520 and the diagram 540 may be equal to T_CDRX ON−(P*T_CDRX ON+T_WUS)=(1−P)*T_CDRX ON−T_WUS. If $0 \leq P \leq 1$ and T_CDRX ON>>T_WUS, the UE may receive a meaningful power savings. In a configuration where T_CDRX ON=10 ms, T_WUS<1 ms, and the probability associated with the WUS=0.5, there may be a 4 ms time period where the UE may conserve power by remaining in the sleep state. The additional 4 ms of sleep time may provide the power savings to the UE.

Figure 8:
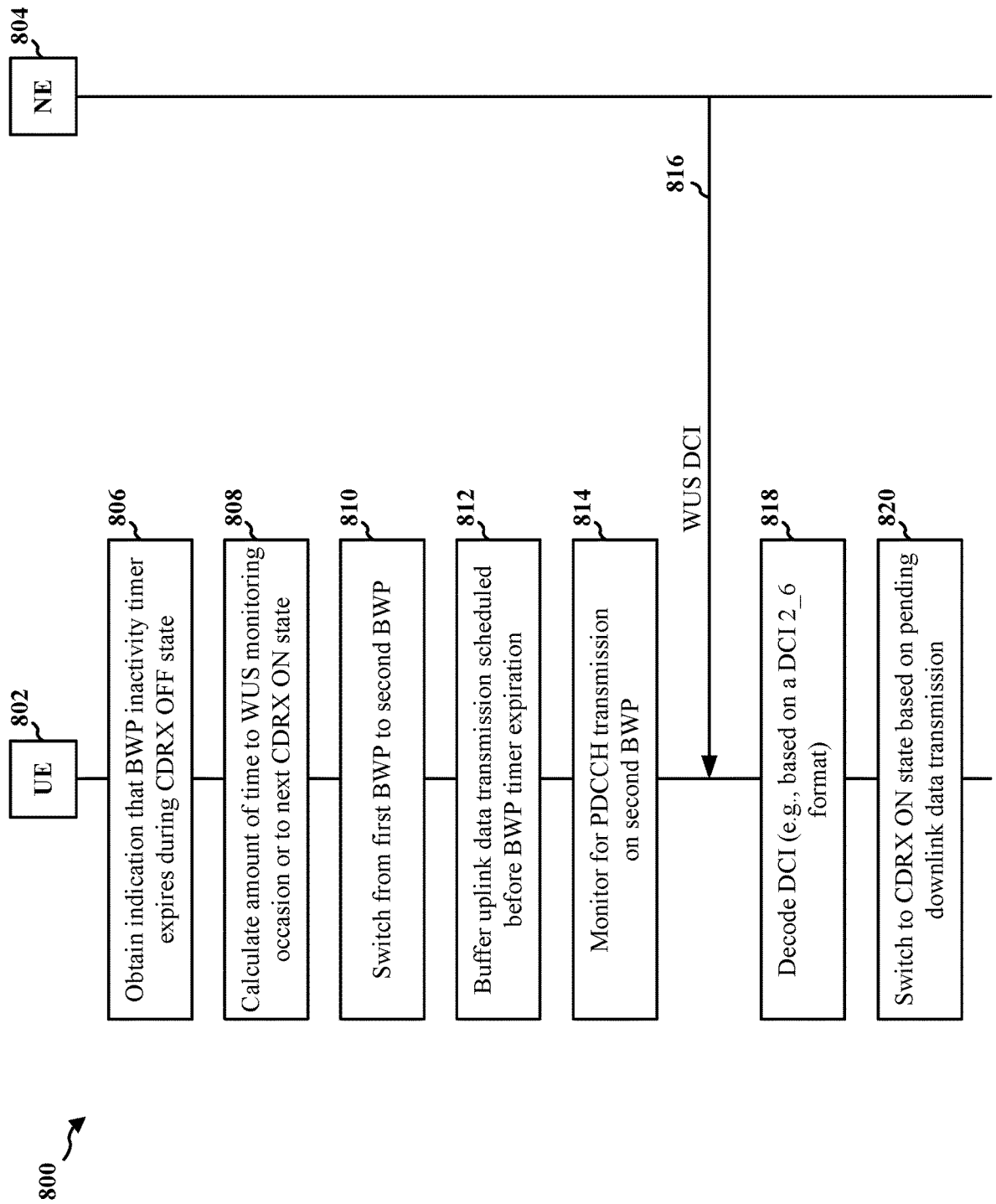
FIG. 8 is a call flow diagram illustrating communications between a UE and a network entity.

FIG. 8 is a call flow diagram 800 illustrating communications between a UE 802 and a network entity 804. The network entity 804 may correspond to a base station or an entity at a base station, such as a CU, a DU, an RU, etc. At 806, the UE 802 may obtain an indication that a BWP inactivity timer expires during a CDRX OFF state. For example, the UE 802 may receive an indication that the BWP timer expires during the CDRX OFF state or the UE 802 may detect that the expiration of the BWP inactivity timer occurs during the CDRX OFF state.

At 808, the UE 802 may calculate an amount of time to a WUS monitoring occasion and/or to a next CDRX ON state. WUS monitoring occasion refers to a time duration within which the UE monitors and/or receives a WUS from the network. The UE 802 may calculate, at 808, the amount of time to the WUS monitoring occasion, if the UE 802 intends to perform a BWP switch that precedes the WUS monitoring occasion. The UE may also calculate, at 808, the amount of time to the next CDRX ON state. At 810, the UE 802 may switch from the first BWP to the second BWP based on the calculation, at 808, of the amount of time to the WUS monitoring occasion or to the next CDRX ON state.

At 812, the UE 802 may buffer an uplink data transmission scheduled before BWP timer expiration until the BWP timer expires. In cases where the uplink data transmission is buffered until the BWP timer expiration, the UE 802 may transmit the uplink data transmission to the network entity 804 after the expiration of the BWP inactivity timer. At 814, the UE 802 may monitor for a PDCCH transmission from the network entity 804 on the second BWP. For example, the UE 802 may monitor, at 814, for the PDCCH transmission based on the calculation, at 808, for the BWP switch, at 810, being for the amount of time to the WUS monitoring occasion.

At 816, the UE 802 may receive a WUS DCI from the network entity 804. The WUS DCI may indicate whether a downlink data transmission is expected from the network entity 804. Thus, at 818, the UE 802 may decode the DCI received from the network entity 804 (e.g., based on a DCI 2_6 format). At 820, the UE 802 may switch to a CDRX ON state based on whether there is a pending downlink data transmission from the network entity 804. An indication of a pending downlink data transmission from the network entity 804 may be indicated via the payload of the WUS DCI received, at 816, from the network entity 804. In further examples, the indication of the pending downlink data transmission from the network entity 804 may be indicated based on a query of an upper layer of the UE 802. The UE 802 may communicate with the network entity 804 based on the switched BWP and/or the switch to the CDRX ON state.

Figure 9:
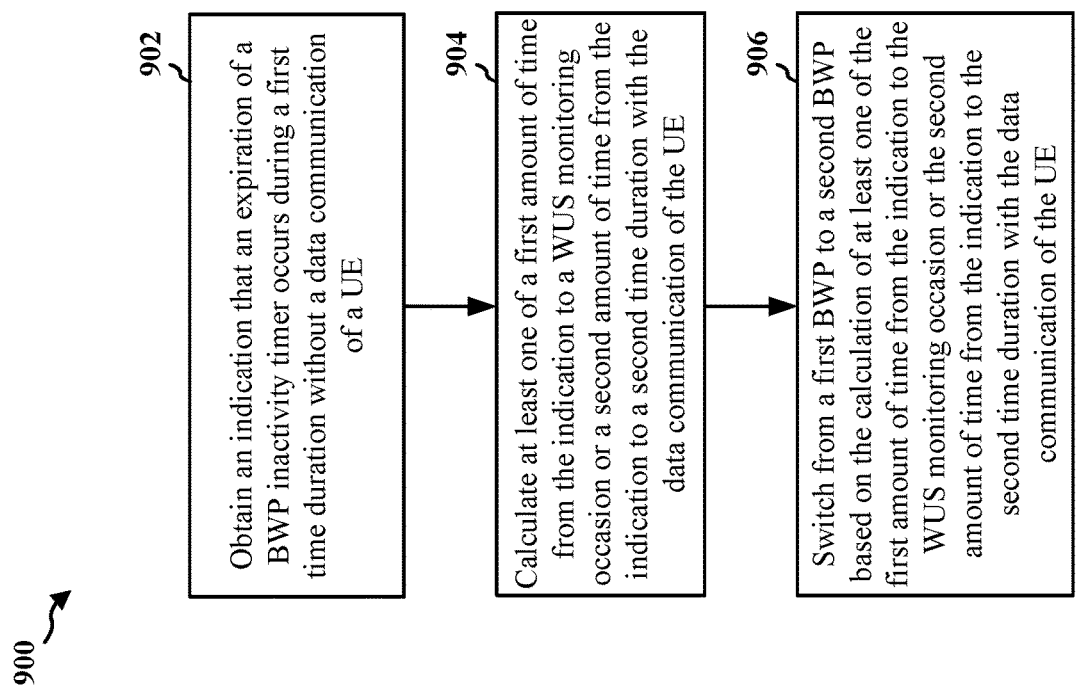
FIG. 9 is a flowchart of a method of wireless communication at a UE.

FIG. 9 is a flowchart 900 of a method of wireless communication. The method may be performed by a UE (e.g., the UE 104, 350, 802, the apparatus 1104, etc.), which may include the memory 360 and which may correspond to the entire UE 104, 350, 802 or apparatus 1104, or a component of the UE 104, 350, 802 or the apparatus 1104, such as the TX processor 368, the RX processor 356, the controller/processor 359, the cellular baseband processor 1124, and/or the application processor 1106.

At 902, the UE may obtain an indication that an expiration of a BWP inactivity timer occurs during a first time duration without a data communication of the UE. For example, referring to FIG. 8, the UE 802 may obtain, at 806, an indication that a BWP inactivity timer expires during the CDRX OFF state. Referring to FIGS. 5-7, the UE may obtain the indication, at 524, 544, 604, and 706, that the BWP timer expires during a CDRX sleep slot (e.g., 704). The obtaining, at 902, may be performed by the BWP switching component 198 of the apparatus 1104 in FIG. 11.

At 904, the UE may calculate at least one of a first amount of time from the indication to a WUS monitoring occasion or a second amount of time from the indication to a second time duration with the data communication of the UE. For example, referring to FIG. 8, the UE 802 may calculate, at 808, an amount of time to a WUS monitoring occasion or to a next CDRX ON state. Referring to FIGS. 5-6, the UE may calculate the time to WUS decoding 526 (e.g., determine, at 614, T_left time until the WUS occasion). Referring to FIGS. 5 and 7, the UE may calculate the time until the BWP timer expires, at 544 (e.g., determine, at 706, T_left time until the BWP timer expires). The calculation, at 904, may be performed by the BWP switching component 198 of the apparatus 1104 in FIG. 11.

At 906, the UE may switch from a first BWP to a second BWP based on the calculation of at least one of the first amount of time from the indication to the WUS monitoring occasion or the second amount of time from the indication to the second time duration with the data communication of the UE. For example, referring to FIG. 8, the UE 802 may switch, at 810, from the first BWP to the second BWP based on the calculation, at 808, of the amount of time until the WUS occasion or the next CDRX ON state. Referring to FIGS. 5-7, the UE may perform the BWP switch, at 530, 550, 622, and 714, based on the calculation of T_left. The switching, at 906, may be performed by the BWP switching component 198 of the apparatus 1104 in FIG. 11.

Figure 10:
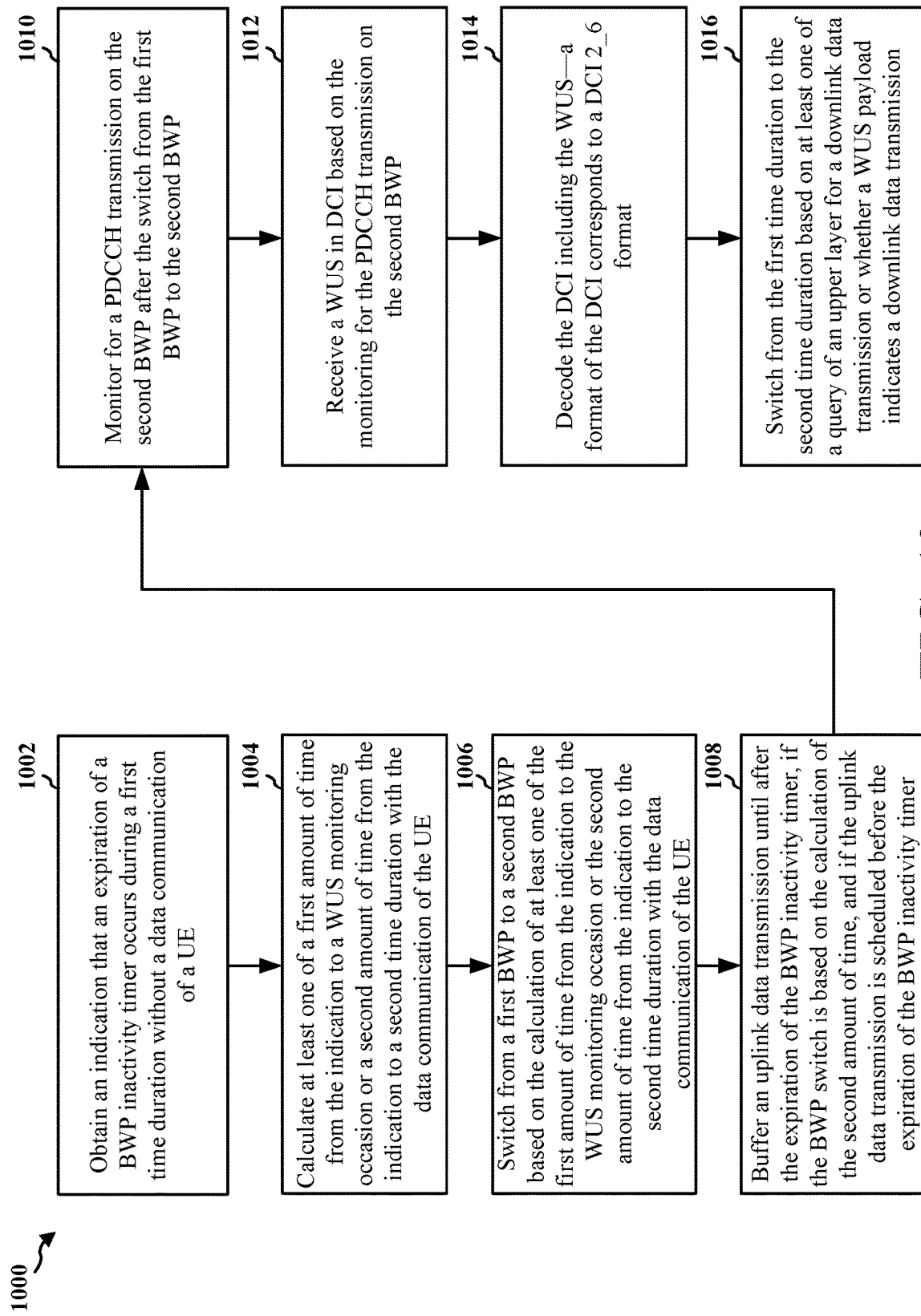
FIG. 10 is a flowchart of a method of wireless communication at a UE.

FIG. 10 is a flowchart 1000 of a method of wireless communication. The method may be performed by a UE (e.g., the UE 104, 350, 802, the apparatus 1104, etc.), which may include the memory 360 and which may correspond to the entire UE 104, 350, 802 or apparatus 1104, or a component of the UE 104, 350, 802 or the apparatus 1104, such as the TX processor 368, the RX processor 356, the controller/processor 359, the cellular baseband processor 1124, and/or the application processor 1106.

At 1002, the UE may obtain an indication that an expiration of a BWP inactivity timer occurs during a first time duration without a data communication of the UE. For example, referring to FIG. 8, the UE 802 may obtain, at 806, an indication that a BWP inactivity timer expires during the CDRX OFF state. Referring to FIGS. 5-7, the UE may obtain the indication, at 524, 544, 604, and 706, that the BWP timer expires during a CDRX sleep slot (e.g., 704). The obtaining, at 1002, may be performed by the BWP switching component 198 of the apparatus 1104 in FIG. 11.

At 1004, the UE may calculate at least one of a first amount of time from the indication to a WUS monitoring occasion or a second amount of time from the indication to a second time duration with the data communication of the UE. For example, referring to FIG. 8, the UE 802 may calculate, at 808, an amount of time to a WUS monitoring occasion or to a next CDRX ON state. Referring to FIGS. 5-6, the UE may calculate the time to WUS decoding 526 (e.g., determine, at 614, T_left time until the WUS occasion). Referring to FIGS. 5 and 7, the UE may calculate the time until the BWP timer expires, at 544 (e.g., determine, at 706, T_left time until the BWP timer expires). The calculation, at 1004, may be performed by the BWP switching component 198 of the apparatus 1104 in FIG. 11.

At 1006, the UE may switch from a first BWP to a second BWP based on the calculation of at least one of the first amount of time from the indication to the WUS monitoring occasion or the second amount of time from the indication to the second time duration with the data communication of the UE. For example, referring to FIG. 8, the UE 802 may switch, at 810, from the first BWP to the second BWP based on the calculation, at 808, of the amount of time until the WUS occasion or the next CDRX ON state. Referring to FIGS. 5-7, the UE may perform the BWP switch, at 530, 550, 622, and 714, based on the calculation of T_left. The switching, at 1006, may be performed by the BWP switching component 198 of the apparatus 1104 in FIG. 11.

At 1008, the UE may buffer an uplink data transmission until after the expiration of the BWP inactivity timer, if the BWP switch is based on the calculation of the second amount of time, and if the uplink data transmission is scheduled before the expiration of the BWP inactivity timer. For example, referring to FIG. 8, the UE 802 may buffer, at 812, an uplink data transmission scheduled before BWP timer expiration (e.g., based on the calculation corresponding to the second amount of time to the CDRX ON state). Referring to FIG. 7, the UE may buffer, at 718, uplink data until after the BWP timer expires. The buffering, at 1008, may be performed by the BWP switching component 198 of the apparatus 1104 in FIG. 11.

At 1010, the UE may monitor for a PDCCH transmission on the second BWP after the switch from the first BWP to the second BWP. For example, referring to FIG. 8, the UE 802 may monitor, at 814, for a PDCCH transmission from the network entity 804 on the second BWP. Referring to FIG. 5, the UE may monitor for the PDCCH transmission before WUS decoding 526 after the BWP switch 530. The monitoring, at 1010, may be performed by the BWP switching component 198 of the apparatus 1104 in FIG. 11.

At 1012, the UE may receive a WUS in DCI based on the monitoring for the PDCCH transmission on the second BWP. For example, referring to FIG. 8, the UE 802 may receive, at 816, a WUS DCI from the network entity 804 based on monitoring, at 814, for the PDCCH transmission from the network entity 804 on the second BWP. The reception, at 1012, may be performed by the BWP switching component 198 of the apparatus 1104 in FIG. 11.

At 1014, the UE may decode the DCI including the WUS—a format of the DCI corresponds to a DCI 2_6 format. For example, referring to FIG. 8, the UE 802 may decode, at 818, the DCI (e.g., based on a DCI 2_6 format). Referring to FIG. 6, the UE may decode the WUS DCI, at 624. The decoding, at 1014, may be performed by the BWP switching component 198 of the apparatus 1104 in FIG. 11.

At 1016, the UE may switch from the first time duration to the second time duration based on at least one of a query of an upper layer for a downlink data transmission or whether a WUS payload indicates a downlink data transmission. For example, referring to FIG. 8, the UE 802 may switch, at 820, to the CDRX ON state based on a pending downlink data transmission from the network entity 804. Referring to FIGS. 5 and 7, the UE may switch to CDRX ON 542*b* based on a query, at 710, of the upper layers for a pending data transmission. Referring to FIGS. 5-6, the UE may switch to CDRX ON 522*b*/630 based on determining, at 626, the that WUS=true. The switching, at 1016, may be performed by the BWP switching component 198 of the apparatus 1104 in FIG. 11.

Figure 11:
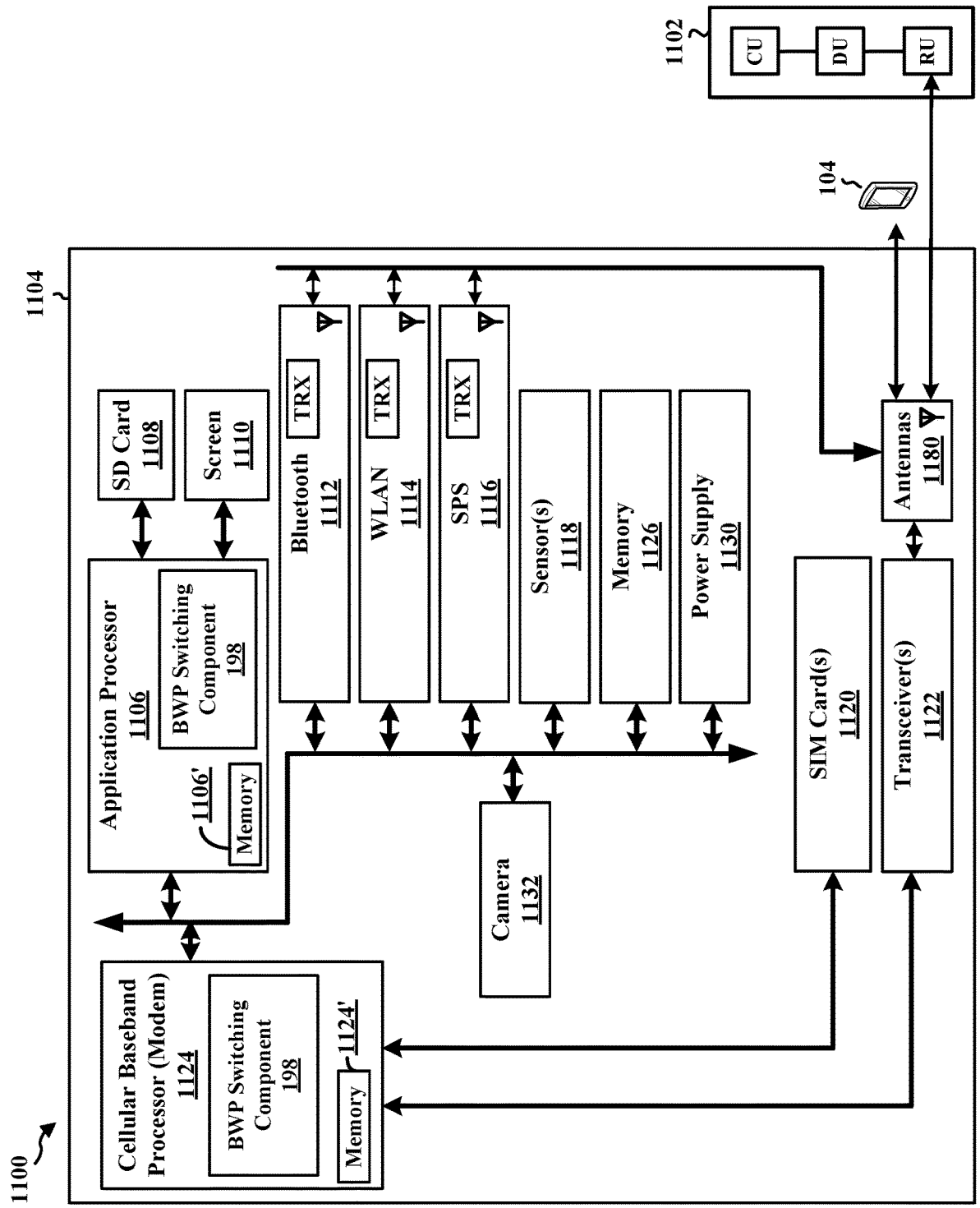
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional modules of memory 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional modules of memory 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the BWP switching component 198 is configured to obtain an indication that an expiration of a BWP inactivity timer occurs during a first time duration without a data communication of the UE; calculate at least one of a first amount of time from the indication to a WUS monitoring occasion or a second amount of time from the indication to a second time duration with the data communication of the UE; and switch from a first BWP to a second BWP based on the calculation of at least one of the first amount of time from the indication to the WUS monitoring occasion or the second amount of time from the indication to the second time duration with the data communication of the UE. The BWP switching component 198 may be within the cellular baseband processor 1124, the application processor 1106, or both the cellular baseband processor 1124 and the application processor 1106. The BWP switching component 198 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1104 may include a variety of components configured for various functions. In one configuration, the apparatus 1104, and in particular the cellular baseband processor 1124 and/or the application processor 1106, includes means for obtaining an indication that an expiration of a BWP inactivity timer occurs during a first time duration without a data communication of the UE; means for calculating at least one of a first amount of time from the indication to a WUS monitoring occasion or a second amount of time from the indication to a second time duration with the data communication of the UE; and means for switching from a first BWP to a second BWP based on the calculation of at least one of the first amount of time from the indication to the WUS monitoring occasion or the second amount of time from the indication to the second time duration with the data communication of the UE. The means for obtaining the indication that the expiration of the BWP inactivity timer occurs during the first time duration without the data communication of the UE is further configured to: receive the indication that the expiration of the BWP inactivity timer occurs during the first time duration without the data communication of the UE; or detect that the expiration of the BWP inactivity timer occurs during the first time duration without the data communication of the UE. The apparatus 1104 further includes means for monitoring for a PDCCH transmission on the second BWP after the switch from the first BWP to the second BWP. The apparatus 1104 further includes means for receiving a WUS in DCI based on the monitoring for the PDCCH transmission on the second BWP. The apparatus 1104 further includes means for switching from the first time duration without the data communication of the UE to the second time duration with the data communication of the UE based on whether the WUS indicates a downlink data transmission. The apparatus 1104 further includes means for decoding the DCI including the WUS, where a format of the DCI corresponds to a DCI 2_6 format. The apparatus 1104 further includes means for receiving a configuration indicative of at least one of a time of the WUS monitoring occasion or a duration of the WUS monitoring occasion. The apparatus 1104 further includes means for buffering the uplink data transmission until the expiration of the BWP inactivity timer; and means for transmitting the uplink data transmission on the second BWP after the expiration of the BWP inactivity timer. The apparatus 1104 further includes means for switching from the first time duration without the data communication of the UE to the second time duration with the data communication of the UE based on a payload of a WUS, where the switch from the first BWP to the second BWP is based on whether a downlink data transmission is scheduled.

The means may be the BWP switching component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: obtaining an indication that an expiration of a BWP inactivity timer occurs during a first time duration without a data communication of the UE; calculating at least one of a first amount of time from the indication to a WUS monitoring occasion or a second amount of time from the indication to a second time duration with the data communication of the UE; and switching from a first BWP to a second BWP based on the calculation of at least one of the first amount of time from the indication to the WUS monitoring occasion or the second amount of time from the indication to the second time duration with the data communication of the UE.

Aspect 2 may be combined with aspect 1 and includes that the switch from the first BWP to the second BWP occurs before the WUS monitoring occasion based on calculating the first amount of time from the indication to the WUS monitoring occasion.

Aspect 3 may be combined with any of aspects 1-2 and includes that the switch from the first BWP to the second BWP before the WUS monitoring occasion is further based on a time duration for performing the switch from the first BWP and the second BWP.

Aspect 4 may be combined with any of aspects 1-3 and further includes monitoring for a PDCCH transmission on the second BWP after the switch from the first BWP to the second BWP.

Aspect 5 may be combined with any of aspects 1-4 and further includes receiving a WUS in DCI based on the monitoring for the PDCCH transmission on the second BWP.

Aspect 6 may be combined with any of aspects 1-5 and further includes switching from the first time duration without the data communication of the UE to the second time duration with the data communication of the UE based on whether the WUS indicates a downlink data transmission.

Aspect 7 may be combined with any of aspects 1-6 and further includes decoding the DCI including the WUS, where a format of the DCI corresponds to a DCI 2-6 format.

Aspect 8 may be combined with any of aspects 1-7 and further includes receiving a configuration indicative of at least one of a time of the WUS monitoring occasion or a duration of the WUS monitoring occasion.

Aspect 9 may be combined with any of aspects 1-8 and includes that the switch from the first BWP to the second BWP occurs before the expiration of the BWP inactivity timer based on calculating the second amount of time from the indication to the expiration of the BWP inactivity timer.

Aspect 10 may be combined with any of aspects 1-9 and includes that an uplink data transmission is scheduled before the expiration of the BWP inactivity timer, and further includes: buffering the uplink data transmission until the expiration of the BWP inactivity timer; and transmitting the uplink data transmission on the second BWP after the expiration of the BWP inactivity timer.

Aspect 11 may be combined with any of aspects 1-10 and includes that the second amount of time is greater than or equal to a time duration for performing the switch from the first BWP and the second BWP.

Aspect 12 may be combined with any of aspects 1-11 and further includes switching from the first time duration without the data communication of the UE to the second time duration with the data communication of the UE based on a payload of a WUS, where the switch from the first BWP to the second BWP is based on whether a downlink data transmission is scheduled.

Aspect 13 may be combined with any of aspects 1-12 and includes that the switch from the first BWP to the second BWP occurs after a last slot of the second time duration with the data communication of the UE.

Aspect 14 may be combined with any of aspects 1-13 and includes that obtaining the indication that the expiration of the BWP inactivity timer occurs during the first time duration without the data communication of the UE further includes: receiving the indication that the expiration of the BWP inactivity timer occurs during the first time duration without the data communication of the UE; or detecting that the expiration of the BWP inactivity timer occurs during the first time duration without the data communication of the UE.

Aspect 15 is an apparatus for wireless communication at a UE, including: a memory; and at least one processor coupled to the memory and, based at least in part on information stored in the memory, the at least one processor is configured to implement a method as in any of aspects 1-14.

Aspect 16 is an apparatus for wireless communication including means for implementing a method as in any of aspects 1-14.

Aspect 17 may be combined with any of aspects 15-16 and further includes at least one of a transceiver or an antenna coupled to the at least one processor.

Aspect 18 is a computer-readable medium (e.g., a non-transitory computer-readable medium) storing computer executable code, the code when executed by at least one processor causes the at least one processor to implement a method as in any of aspects 1-14.

What is claimed is:

1. An apparatus for wireless communication at a user equipment (UE), comprising:
   memory; and
   at least one processor coupled to the memory and, based at least in part on information stored in the memory, the at least one processor is configured to:
   obtain an indication that an expiration of a bandwidth part (BWP) inactivity timer occurs during a first time duration without a data communication of the UE;
   calculate at least one of a first amount of time from the indication to a wake-up signal (WUS) monitoring occasion or a second amount of time from the indication to a second time duration with the data communication of the UE; and switch from a first BWP to a second BWP before the expiration of the BWP inactivity timer based on the calculation of the second amount of time from the indication to the expiration of the BWP inactivity timer.

2. The apparatus of claim 1, wherein the switch from the first BWP to the second BWP occurs before the WUS monitoring occasion based on the calculation of the first amount of time from the indication to the WUS monitoring occasion.

3. The apparatus of claim 2, wherein the switch from the first BWP to the second BWP before the WUS monitoring occasion is further based on a time duration to perform the switch from the first BWP and the second BWP.

4. The apparatus of claim 2, wherein the at least one processor is further configured to monitor for a physical downlink control channel (PDCCH) transmission on the second BWP after the switch from the first BWP to the second BWP.

5. The apparatus of claim 4, wherein the at least one processor is further configured to receive a WUS in downlink control information (DCI) based on monitoring for the PDCCH transmission on the second BWP.

6. The apparatus of claim 5, wherein the at least one processor is further configured to switch from the first time duration without the data communication of the UE to the second time duration with the data communication of the UE based on whether the WUS indicates a downlink data transmission.

7. The apparatus of claim 5, wherein the at least one processor is further configured to decode the DCI including the WUS, wherein a format of the DCI corresponds to a DCI 2_6 format.

8. The apparatus of claim 1, wherein the at least one processor is further configured to receive a configuration indicative of at least one of a time of the WUS monitoring occasion or a duration of the WUS monitoring occasion.

9. The apparatus of claim 1, wherein an uplink data transmission is scheduled before the expiration of the BWP inactivity timer, the at least one processor further configured to:
buffer the uplink data transmission until the expiration of the BWP inactivity timer; and
transmit the uplink data transmission on the second BWP after the expiration of the BWP inactivity timer.

10. The apparatus of claim 1, wherein the second amount of time is greater than or equal to a duration for performing the switch from the first BWP and the second BWP.

11. The apparatus of claim 1, wherein the at least one processor is further configured to switch from the first time duration without the data communication of the UE to the second time duration with the data communication of the UE based on a payload of a WUS, wherein the switch from the first BWP to the second BWP is based on whether a downlink data transmission is scheduled.

12. The apparatus of claim 1, wherein to obtain the indication that the expiration of the BWP inactivity timer occurs during the first time duration without the data communication of the UE the at least one processor is further configured to:
receive the indication that the expiration of the BWP inactivity timer occurs during the first time duration without the data communication of the UE; or
detect that the expiration of the BWP inactivity timer occurs during the first time duration without the data communication of the UE.

13. The apparatus of claim 1, further comprising at least one of a transceiver or an antenna coupled to the at least one processor.

14. A method of wireless communication at a user equipment (UE), comprising:
obtaining an indication that an expiration of a bandwidth part (BWP) inactivity timer occurs during a first time duration without a data communication of the UE;
calculating at least one of a first amount of time from the indication to a wake-up signal (WUS) monitoring occasion or a second amount of time from the indication to a second time duration with the data communication of the UE; and
switching from a first BWP to a second BWP before the expiration of the BWP inactivity timer based on the calculation of the second amount of time from the indication to the expiration of the BWP inactivity timer.

15. The method of claim 14, wherein the switch from the first BWP to the second BWP occurs before the WUS monitoring occasion based on calculating the first amount of time from the indication to the WUS monitoring occasion.

16. The method of claim 15, wherein the switch from the first BWP to the second BWP before the WUS monitoring occasion is further based on a time duration for performing the switch from the first BWP and the second BWP.

17. The method of claim 15, further comprising monitoring for a physical downlink control channel (PDCCH) transmission on the second BWP after the switch from the first BWP to the second BWP.

18. The method of claim 17, further comprising receiving a WUS in downlink control information (DCI) based on the monitoring for the PDCCH transmission on the second BWP.

19. The method of claim 18, further comprising switching from the first time duration without the data communication of the UE to the second time duration with the data communication of the UE based on whether the WUS indicates a downlink data transmission.

20. The method of claim 18, further comprising decoding the DCI including the WUS, wherein a format of the DCI corresponds to a DCI 2_6 format.

21. The method of claim 14, further comprising receiving a configuration indicative of at least one of a time of the WUS monitoring occasion or a duration of the WUS monitoring occasion.

22. The method of claim 14, wherein an uplink data transmission is scheduled before the expiration of the BWP inactivity timer, further comprising:
buffering the uplink data transmission until the expiration of the BWP inactivity timer; and
transmitting the uplink data transmission on the second BWP after the expiration of the BWP inactivity timer.

23. The method of claim 14, wherein the second amount of time is greater than or equal to a duration for performing the switch from the first BWP and the second BWP.

24. The method of claim 14, further comprising switching from the first time duration without the data communication of the UE to the second time duration with the data communication of the UE based on a payload of a WUS, wherein the switch from the first BWP to the second BWP is based on whether a downlink data transmission is scheduled.

25. The method of claim 14, wherein obtaining the indication that the expiration of the BWP inactivity timer occurs during the first time duration without the data communication of the UE comprises:

receiving the indication that the expiration of the BWP inactivity timer occurs during the first time duration without the data communication of the UE; or detecting that the expiration of the BWP inactivity timer occurs during the first time duration without the data communication of the UE.

26. An apparatus for wireless communication at a user equipment (UE), comprising:

means for obtaining an indication that an expiration of a bandwidth part (BWP) inactivity timer occurs during a first time duration without a data communication of the UE;

means for calculating at least one of a first amount of time from the indication to a wake-up signal (WUS) monitoring occasion or a second amount of time from the indication to a second time duration with the data communication of the UE; and means for switching from a first BWP to a second BWP before the expiration of the BWP inactivity timer based on the calculation of the second amount of time from the indication to the expiration of the BWP inactivity timer.

27. A non-transitory computer-readable medium storing computer executable code, the code when executed by at least one processor causes the at least one processor to:

obtain an indication that an expiration of a bandwidth part (BWP) inactivity timer occurs during a first time duration without a data communication of a user equipment (UE);

calculate at least one of a first amount of time from the indication to a wake-up signal (WUS) monitoring occasion or a second amount of time from the indication to a second time duration with the data communication of the UE; and switch from a first BWP to a second BWP before the expiration of the BWP inactivity timer based on the calculation of the second amount of time from the indication to the expiration of the BWP inactivity timer.

* * * * *